(12) United States Patent
Vastmans et al.

(10) Patent No.: US 9,465,181 B2
(45) Date of Patent: Oct. 11, 2016

(54) ORGANIZER FOR AN OPTICAL FIBRE CABLE AND METHOD OF PROVIDING A SPLICE FOR AN OPTICAL FIBRE CABLE

(75) Inventors: Kristof Vastmans, Boutersem (BE); Bart Mattie Claessens, Hasselt (BE); Roel Modest Willy Bryon, Aarschot (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 534 days.

(21) Appl. No.: 13/702,703

(22) PCT Filed: Jun. 7, 2011

(86) PCT No.: PCT/EP2011/059388
§ 371 (c)(1),
(2), (4) Date: Dec. 7, 2012

(87) PCT Pub. No.: WO2011/157596
PCT Pub. Date: Dec. 22, 2011

(65) Prior Publication Data
US 2013/0074311 A1    Mar. 28, 2013

(30) Foreign Application Priority Data

Jun. 15, 2010  (EP) .................................... 10006193

(51) Int. Cl.
*G02B 6/44* (2006.01)
*G02B 6/46* (2006.01)

(52) U.S. Cl.
CPC ........... *G02B 6/4401* (2013.01); *G02B 6/4471* (2013.01); *G02B 6/46* (2013.01); *G02B 6/4454* (2013.01); *Y10T 29/4987* (2015.01)

(58) Field of Classification Search
None
See application file for complete search history.

(56) References Cited

U.S. PATENT DOCUMENTS

| | | | |
|---|---|---|---|
| 5,259,051 A * | 11/1993 | Burack et al. .................. | 385/76 |
| 5,323,478 A | 6/1994 | Milanowski et al. | |
| 6,504,987 B1 * | 1/2003 | Macken et al. ................ | 385/135 |
| 6,788,871 B2 * | 9/2004 | Taylor ........................... | 385/135 |
| 7,340,145 B2 * | 3/2008 | Allen ............................. | 385/135 |
| 2003/0133686 A1 * | 7/2003 | Delrosso et al. ............. | 385/135 |
| 2006/0093302 A1 * | 5/2006 | Solheid et al. ............... | 385/135 |
| 2007/0104447 A1 * | 5/2007 | Allen ............................. | 385/135 |
| 2009/0097813 A1 | 4/2009 | Hill | |
| 2009/0202212 A1 * | 8/2009 | Cox ...................... | G02B 6/4471 385/135 |

FOREIGN PATENT DOCUMENTS

| | | |
|---|---|---|
| DE | 44 38 668 A1 | 5/1996 |
| EP | 0 216 073 A1 | 4/1987 |

(Continued)

OTHER PUBLICATIONS

European Search Report for 10 00 6193 mailed Nov. 18, 2010.

(Continued)

*Primary Examiner* — Uyen Chau N Le
*Assistant Examiner* — John M Bedtelyon
(74) *Attorney, Agent, or Firm* — Merchant & Gould P.C.

(57) ABSTRACT

An organizer for an optical fiber cable has at least two loop retaining sections (16; 33) facing each other with a predetermined distance such that a loop (10) of the optical fiber cable (12) is restrained between the loop retaining sections (16; 33) by an elastic resetting force of the looped optical fiber cable (10). Certain types of organizers are removably mounted to a base to be free-standing.

12 Claims, 7 Drawing Sheets

(56) References Cited

FOREIGN PATENT DOCUMENTS

| WO | WO 9400786 A1 * | 1/1994 |
| WO | WO 03/098306 A1 | 11/2003 |
| WO | WO 2009/106874 A1 | 9/2009 |

OTHER PUBLICATIONS

International Search Report and Written Opinion for PCT/EP2011/059388 mailed Jul. 22, 2011.

European Examination Report for EP Application No. 10 006 193.6 mailed Mar. 5, 2015 (4 pages).

* cited by examiner

ORGANIZER FOR AN OPTICAL FIBRE CABLE AND METHOD OF PROVIDING A SPLICE FOR AN OPTICAL FIBRE CABLE

This application is a National Stage Application of PCT/EP2011/059388, filed Jun. 7, 2011, which claims benefit of Serial No. 10006193.6, filed Jun. 15, 2010 in European Patent Office and which applications are incorporated herein by reference. To the extent appropriate, a claim of priority is made to each of the above disclosed applications.

BACKGROUND

The present invention relates to an organizer for an optical fibre cable and a method for splicing and organizing an optical fibre cable.

It is generally known, that splicing of an optical fibre cable, i.e. the optical connection of the optical fibre core of an optical fibre cable requires provision of the two end sections of the cable with an appropriate functional length. Such functional length is required to appropriately splice, i.e. join the two ends of the optical fibre cable. Splicing in the meaning of this application can be any kind of connection between the optical fibre cable which is suitable to connect the optical fibre element of the cable such, that optical signals can be transmitted over the joint between the two end sections. The splice is usually protected by a splice holder in the form of a splicing sleeve or the like which at least mechanically protects the splice, i.e. joint of the two optical fibre elements in the splicing region. In addition, the splice holder may effect a mechanical connection between the optical fibre elements to be connected. After the splice has been affected the functional length is stored. For this, the functional length is usually coiled to form a loop, which loop is stored. WO 03/098306 A1 discloses an envelope for storing such a loop of an optical fibre cable. According to the prior art, the loop of the optical fibre cable is received within an enclosure formed by the envelope which sealingly protects the loop and the splice.

Another organizer is e.g. known from EP 0 216 073 A1. This organizer comprises a tray with a bottom for holding loops and the splice holders. For the splice holders, multiple receptacles are provided on the bottom that are each adapted to receive and thus secure one splice holder in place. Further, the bottom of the tray is projected by guiding surfaces arranged in circumferential direction of a coiling operation of the optical fibre cable and adapted to support the looped optical fibre cable. The guiding surfaces are provided such, that the optical fibre cable is held within the organizer with a bending radius which is greater than the critical radius of the optical fibre cable. It is well known that an optical fibre cable should not be bent by a bending radius which is smaller than a critical bending radius of the optical fibre cable which will result in light loss or may even result in mechanical damage of the optical fibre cable. This critical, i.e. minimum bending radius is usually approximately 3 cm for an optical fibre cable having a single optical fibre element. Accordingly, the guiding surfaces provided by the organizer of EP 0 216 073 A1 encircle a radius which is larger than the critical bending radius. Usually, the guiding surfaces support a holding element, which extends parallel to the bottom of the tray but with a distance therefrom, such that the looped optical fibre cable is arranged between the bottom and the holding element when being coiled along the guiding surfaces.

SUMMARY

The present invention aims to provide an organizer for an optical fibre cable which allows simple and effective storage of the functional length of an optical fibre cable. This functional length may be the functional length of one free end of an optical fibre cable or two free ends of an optical fibre cable, which may be spliced and provided with a splice holder. Further, the present invention aims to provide a method of organizing an optical fibre cable, in particular, after splicing the same.

Said organizer defines loop retaining sections facing each other and being arranged relative to each other with a predetermined distance. The distance is such, that a loop of the optical fibre cable is restrained between these portions. In other words, the looped optical fibre cable is held between the retaining sections by an elastic force. This elastic force results from elastic resetting of the looped optical fibre cable. Thus, the looped optical fibre cable is predominately, if not exclusively, held by an elastic force caused by coiling of the optical fibre cable under conditions in which the bending radius of the optical fibre cable is not smaller than the critical bending radius, however, close to said radius. Accordingly, the looped optical fibre cable has a certain tendency to attain a less bent constitution, which tendency results in the elastic resetting force.

The looped optical fibre cable may be retained in an oval form. In this case, the predetermined distance of the loop retaining sections is slightly greater that twice the critical bending radius. However, the looped optical fibre cable may likewise have a form with two essentially semicircular end sections providing a convex outer contour with a middle section preferably supported by the two opposing retaining sections which defines a concave outer contour. In this case, the predetermined distance of the retaining sections may even be smaller than twice the critical bending radius of the optical fibre cable.

Usually, the predetermined distance between the opposing retaining sections, against which the outer circumferential surface of the looped optical fibre cable abuts, is between 5,8 and 6,8 cm. For newer generation optical fibres (e.g. as specified in ITU-T Recommendation G.657), also called bent-insensitive fibres, these dimensions may be smaller according to the minimum bent radius of the specified fibre.

According to a preferred embodiment, the organizer comprises fibre cable fixation devices for fixing an incoming and outgoing fibre cable, such that overlength of both can be simultaneously stored in the loop retaining sections. Accordingly, one set of loop retaining sections is sufficient to store both, incoming and outgoing fibre cable in the organizer according to the present invention. The fibre cable fixation devices may be exclusively provided by the loop retaining sections, only. However, other means may be provided to appropriately support the loop of the optical fibre cable.

In a further preferred embodiment, the organizer of the present invention comprises a splice receptacle adapted to receive a splice holder for a splice connection. Respective splice connection will usually connect the two optical fibre cables, i.e. the incoming and the outgoing fibre cable. The receptacle for the splice holder may be provided in vicinity of the loop retaining sections and/or as a separate receptacle being arranged next to one of the loop retaining sections, preferably in close vicinity thereto.

According to a further preferred embodiment, the organizer has a generally C-shaped loop supporting element comprising a foot portion and a head portion. These two portions are arranged opposite to each other and are connected by a lug portion. The foot portion and the head portion usually each define the loop retaining portions facing each other.

According to a further preferred embodiment, the foot portion defines a U-shaped loop foot receptacle, which is adapted to receive a foot section of the loop of the optical fibre cable. Further, the head portion defines a U-shaped loop head receptacle adapted to receive a head section of the loop of the optical fibre cable. In this preferred embodiment, the predetermined distance between the two retaining sections is usually by 5 to 15% larger than twice the critical bending radius. One leg of this U-shaped loop receptacle is usually provided by a proportion of the overall length of the lug portion connecting the foot portion with the head portion. An abutment surface opposed to the surface provided by the lug portion is usually provided by a leg preferably extending parallel to the extension of the lug portion. The free end of this free leg is selected such, that the optical fibre cable can be coiled and thus retained in the C-shaped loop supporting element in a looped constitution with a bending radius slightly larger than the critical bending radius. Due to this, the looped optical fibre cable may bend to a greater extent until reaching critical bending conditions. This bendability, however, will still be guided by the free leg. In other words, even if the looped optical fibre cable is bent to a greater extent until the critical bending radius is reached, the opposing wall sections of the U-shaped loop receptacle will still guide and hold the looped optical fibre cable.

In a preferred embodiment, the foot portion not only defines a U-shaped loop foot receptacle adapted to receive a foot section of the loop of the optical fibre cable but also defines a U-shaped splice receptacle which is adapted to receive a splice holder. The splice receptacle can be dimensioned such, that multiple splice holders can be received within the splice receptacle. Further, the splice receptacle may comprise specific means to arrange the splice holder or plural splice holders in an organized way within the splice receptacle. The splice receptacle may e.g. comprise spring lugs which cooperate with the upper splice holder stacked within the U-shaped splice receptacle to secure all splice holders within the U-shaped splice receptacle.

A U-shaped loop head receptacle preferably is provided by the head portion and adapted to receive a head section of the looped optical fibre cable, may be provided in the form of a head cover circumferentially enclosing at least a part of the looped optical fibre cable. In this preferred embodiment, there is provided a gap between a rim of said head cover and the free end of a leg defining the U-shaped foot receptacle for a foot part of the looped optical fibre cable.

In an alternative embodiment, the organizer comprises a cover which can be provided separately from the C-shaped loop retaining element and is adapted to at least partially receive a respective C-shaped loop supporting element. In other words, the C-shaped loop supporting element can be introduced into the cover to cover and thereby protect looped optical fibre cables. The cover usually has fixation means adapted to releasably fix said cover in a mounted state in which the C-shaped loop supporting element is at least partially introduced into the cover and in which the cover is directly or indirectly secured to the C-shaped loop supporting element. The cover preferably has an opening exposing the head portion of the C-shaped loop supporting element in the mounted state. Further, an apex of the cover is approximately level with an apex of the head portion when the cover is held in a mounted state. This preferred embodiment results in a rather compact arrangement as the cover does not have to be held above the head portion. In fact, the looped optical fibre cable is protected by the head portion of the C-shaped loop supporting element while sections of the looped optical fibre cable projecting from the head portion of the C-shaped loop supporting element are covered and thereby protected by the cover. Preferably, the cover is provided with snapping hooks for releasably fixing the cover in the mounted state. The snapping hooks preferably provide an oblique sliding surface which elastically bends the snapping hooks when bringing the cover in the mounted state such, that the snapping hooks will elastically bend in the opposite direction and thus secure the cover once the same has gained the mounted position. In this mounted position, the cover may be secured directly against the C-shaped loop supporting element and/or a housing or base to which the C-shaped loop supporting element is secured.

The organizer for an optical fibre cable preferably comprises a base element defining cable guiding in and cable guiding out passages, which passages are usually defined by a means suitable to hold one or more optical fibre cables relative to the base element in a predetermined manner, i.e. place and/or orientation. Further, there is provided a support section arranged between the associated cable guiding in and cable guiding out passages. Those associated cable guiding passages do not necessarily have to comprise specific means for holding the optical fibre cable in the guiding passage in a predetermined way. Still further, in the preferred embodiment, the foot portion of the C-shaped loop supporting element defines securing means which are provided on a side of the foot portion opposite to the loop retaining section and which securing means are adapted to cooperate with the support section of the base element such, that the C-shaped loop supporting element is supported on the base element in a free standing manner. Such support may be a temporary support. Accordingly, other orientations of the C-shaped loop supporting element may be feasible. In particular, the C-shaped loop supporting element may be secured to the base element by a hinge to allow not only a free-standing orientation of the C-shaped loop supporting element relative to the base element but also an inclined orientation or an orientation in which the C-shaped loop supporting element and the looped optical fibre cable held by the same are arranged essentially parallel to the base element, like e.g. a bottom of a housing.

According to a preferred embodiment, the securing means and the support section are adapted to releasably fix the C-shaped loop supporting element on the base element in a free-standing manner. Thus, the C-shaped loop supporting element may be removed from the base element e.g. to coil an optical fibre cable in said C-shaped loop supporting element and return the same to the base element for fixation thereon. Such specific designs may facilitate storing of the functional length of the optical fibre element e.g. after splicing.

Preferably, the base element provides a support surface adapted to slidably guide the securing means and thus the C-shaped loop supporting element. The support surface is provided with a groove adapted to hold the securing means in a keyed manner. Preferably, in this keyed manner, the C-shaped loop supporting element is secured on the base element in a free-standing manner. The groove preferably terminates in a hammer head opening adapted to receive the securing means when being inserted through the support surface. The base element furthermore provides preferably a spring lug arranged in the vicinity of the support surface and being adapted to cooperate with the securing means such, that the C-shaped loop supporting element is secured against the base element, most preferably in a free-standing manner by the spring lug cooperating with the securing means.

The present invention provides a method of organizing an optical fibre cable. This method comprises the known steps of providing two end sections, one of the incoming and one of an outgoing optical fibre cable to be spliced with a functional length appropriate to conduct splicing. The free ends are then spliced to obtain a spliced optical fibre cable. After that, the splice is stored in an organizer as previously described. Usually, the splice, i.e. the splice holder is received in the foot portion of the C-shaped loop supporting element. After that, a loop is formed by coiling the functional length of the optical fibre cable and arranged in the C-shaped loop supporting element. When coiling the functional length, the optical fibre cable can be coiled between the foot portion and the head portion. Alternatively, a looped optical fibre cable can be coiled and then placed into the C-shaped loop supporting element thereafter. Finally, the looped optical fibre cable is stored, such that the loop of the optical fibre cable is restrained between the foot portion and the head portion by an elastic resetting force, which resetting force is generated by the looped optical fibre cable and resulting in a coiled storage, whereby the minimum bending radius is respected. When coiling the optical fibre cable, the actual bending radius of the cable may fall below the critical bending radius, below which optical losses may occur, but will not fall below a critical bending radius indicating likeliness of mechanical damage of the optical fibre cable. However, due to elastic resetting, the looped optical fibre cable will expand when being stored in the organizer of the present invention, thus, attaining an actual bending radius, which does not cause optical loss.

Preferably, the incoming and outgoing fibre cables are fixed before storing them in the organizer according to the present invention.

Alternatively, the step of coiling the incoming and outgoing fibre cables is simultaneously coiled before storing the same.

BRIEF DESCRIPTION OF THE DRAWINGS

Various embodiments of the present invention will now be more particularly described by way of example only, with reference to the accompanying drawings in which.

DETAILED DESCRIPTION

Figure 1:
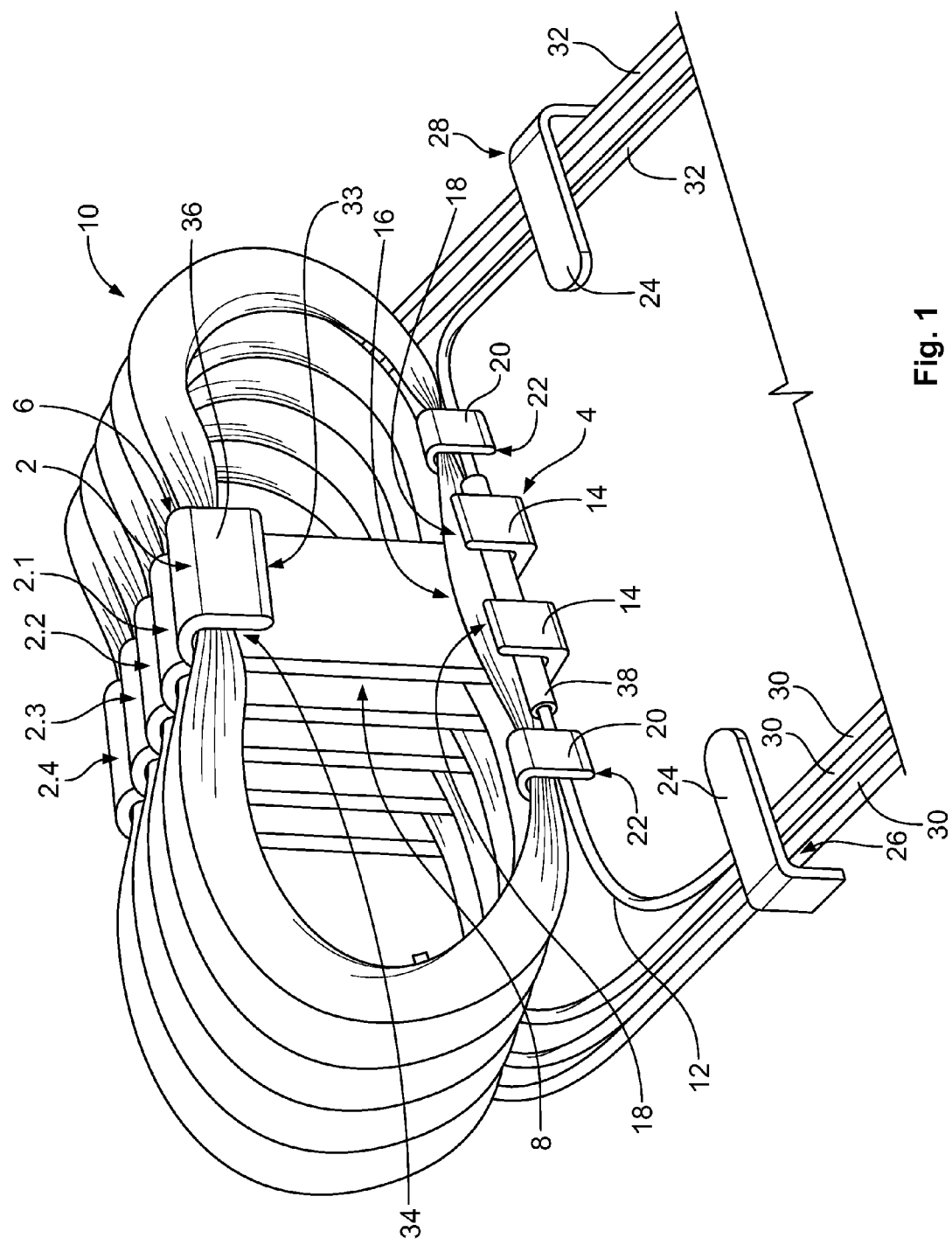
FIG. 1 is a perspective view showing an organizer for an optical fibre cable.
Figure 2:
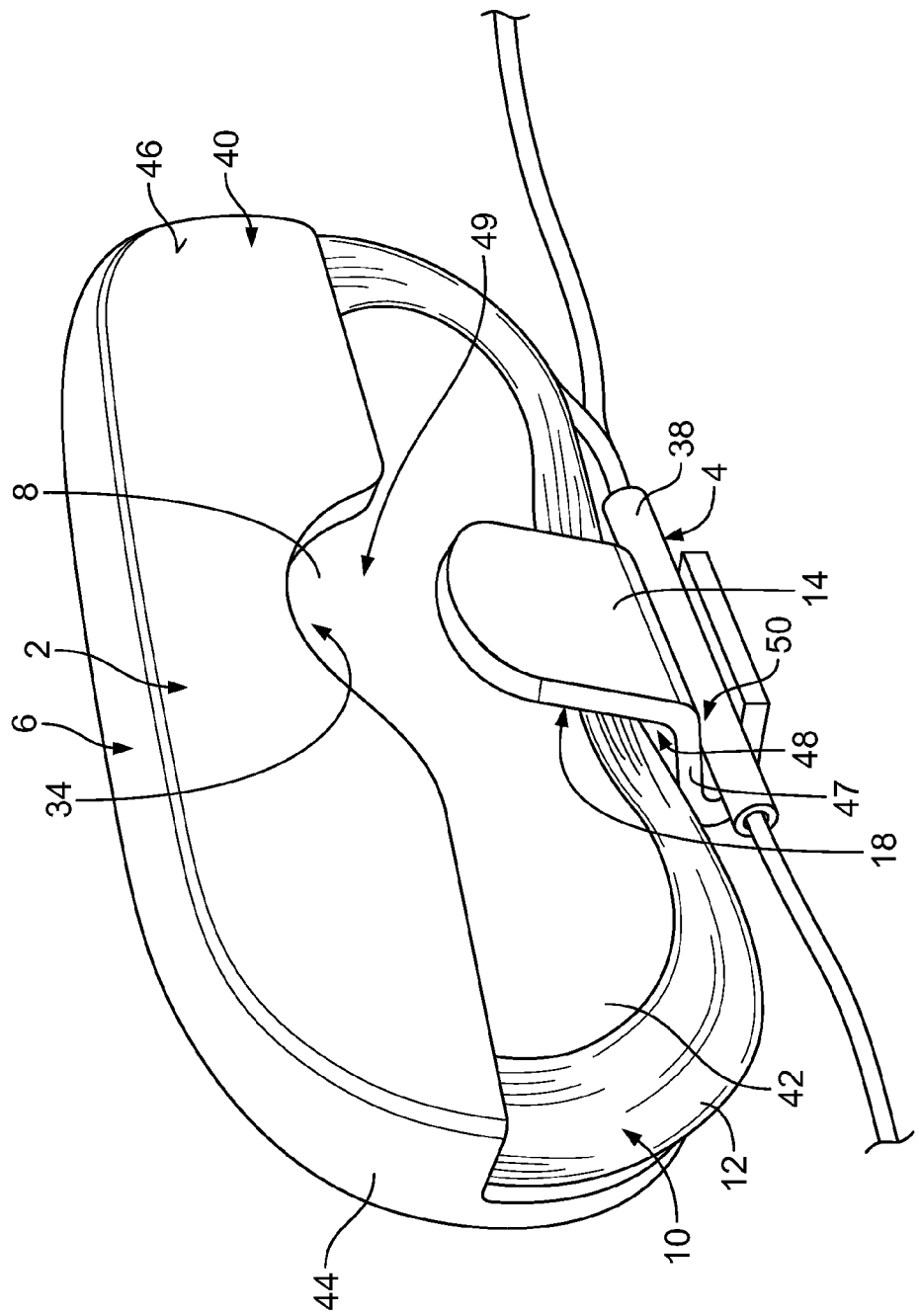
FIG. 2 is a perspective view of a second embodiment of an organizer for an optical fibre cable.

FIGS. 1 and 2 each show an embodiment of an organizer which is comprised of a generally C-shaped loop supporting element 2. This loop supporting element 2 comprises a foot portion 4, a head portion 6 and a lug portion 8 connecting the foot portion 6 with the head portion 6.

The embodiment of FIG. 2 shows a rather simple constitution in which the head portion 6 and the lug portion 8 have identical length. The length is to be understood as the extension of respective portions essentially parallel to the main extension of a loop 10 of an optical fibre 12, which loop is received and held by the loop supporting element 2.

Essentially with the lug portion 8 and the head portion 6, there are provided two legs 14 being spaced from each other and extending parallel to the extension of the lug portion 8, which legs 14 delimit a loop retaining section 16 on the side of the foot portion 4 and thereby define a U-shaped loop foot receptacle 18. The forward abutment surface of said U-shaped loop foot receptacle 18 is provided by the legs 14 whereas the rearward abutment surface is defined by the lower portion of the lug portion 8.

On both sides of the legs 14, there are provided holding lugs 20 which are formed opposite to the legs 14. Thus, the holding lugs 20 are each formed with a U-shaped cross-section. However, the U-shaped profile of the holding lugs 20 defines an opening 22 to the lower side of the C-shaped loop supporting element 2, whereas the loop retaining section 16 is open to the opposite direction. The holding lugs 20 are each connected to the lug portion 8 by bars which extend in the plane of the lug portion 8 and with a direction perpendicular to the main extension of the lug portion 8.

The above elements are all part of a unitary body of said C-shaped loop supporting element 2.

FIG. 1 furthermore shows holding elements 24 provided on a base element (not shown) and the defining cable in passage 26 and a cable out passage 28 for the optical fibre cable 12. In the cable in passage 26 there are provided plural feeder optical fibre cables 30, each of said feeder optical fibre cables 30 is branched off to an assigned C-shaped loop supporting element. The optical fibre cable 12 leading to the cable out passage 28 forms a drop optical fibre cable 32, which merges with plural other drop optical fibre cables 32 from other C-shaped loop supporting elements 2.1 to 2.4 shown in FIG. 1 in shaded lines.

Each of the C-shaped loop supporting elements 2 defines at the head portion 6 thereof a loop retaining section 33 having a U-shaped loop head receptacle 34, one abutment face thereof being defined by the lug portion 8, the other by a downwardly extending leg 36. The width of the U-shaped loop head receptacle 34 corresponds to that of the U-shaped loop foot receptacle 18. The width is the extension of respective receptacles 18, 34 in a direction perpendicular to the abutment face provided by the lug portion 8.

For providing the loop 10 of the optical fibre cable 12 shown in FIG. 1, a sufficient functional length of a feeder optical fibre cable 30 and a drop optical fibre cable 32 is prepared. Then, the optical core of each of those cables 30, 32 is spliced, i.e. the cores are connected to each other to allow transmission of an optical signal through the joint of both cables 30, 32. Splicing can e.g. be attained by a mechanical splice effected by a splicing sleeve. Said splicing sleeve can be considered as a splice holder identified with reference numeral 38 in FIG. 1. After splicing, the splice holder 38 is placed in the splice receptacle 50. After that, the functional length of the optical fibre cable 12 leading to the cable in passage 26 and that leading to the cable out passage 28 are coiled to arrive at a looped optical fibre cable 10. This looped optical fibre cable 10 is then placed in the C-shaped loop supporting element. For this, the upper middle portion of the looped optical fibre cable 10 is introduced into the U-shaped loop head receptacle 34 while the lower part of the looped optical fibre cable 10 is positioned in the U-shaped loop foot receptacle 18 and introduced through the lower openings 22 into the U-shaped openings provided by the outer holding lugs 20.

The distance between the loop retaining section 16 of the foot portion 4 and the loop retaining section 33 of the head portion 6 is selected such, that the looped optical fibre cable 10 is retained within the C-shaped loop supporting element under a compressive force. The material of the looped optical fibre cable 10 exhibits a certain resetting force due to the coiling of the optical fibre cable 12. This resetting force is employed to secure the looped optical fibre cable 10 between the two loop retaining sections 16, 33. These loop retaining sections 16, 33, i.e. specifically, the base of the two U-shaped loop receptacles 18, 34 is such, that the looped optical fibre cable 10 can be bent inwardly without reaching the critical bending radius to such an extent, that the looped optical fibre cable 10 can be released from the loop retaining section 33 provided by the head portion 6. Thus, the looped optical fibre cable 10 may be dismounted from the loop supporting element 2 or introduced into said supporting element 2 in the looped constitution. However, the distance between the two retaining portions 16, 33 is such, that the looped optical fibre cable 10 abutting against these sections 16, 18 still provides a sufficient resetting force to press the loop 10 against those retaining sections 16, 18.

FIG. 2 shows an alternative embodiment. In this embodiment, the C-shaped loop supporting element 2 is integrally formed with a head cover 40. This head cover 40 has a back face 42 which incorporates the lug portion 8 and extends between the foot portion 4 and the head portion 6. In a direction transverse thereto, the head cover 40 provides a basis for the entire looped optical fibre cable 10. In other words, the spatial extension of the head cover back face 42 corresponds with the spatial extension of the looped optical fibre cable 10.

Starting approximately at mid-height of the looped optical fibre cable 10, the head cover 40 provides a circumferential enclosure 44 for the looped optical fibre cable 10 shielding the upper portion of the loop. Above that point, the head cover 40 defines a front face 46 which in combination with the back face 42 defines a U-shaped opening for the looped optical fibre cable 10.

The embodiment of FIG. 2 has only one bottom leg 14 which is slightly oblique relative to the back face 42 thereby providing a funnel-like U-shaped loop foot receptacle 18. A bottom 48 of said receptacle 18 defines a lateral sidewall 47 of a U-shaped splice receptacle 50, which is adapted to hold and clamp the splice holder 38.

The front face 46 of the head cover 40 defines a recess 49 arranged opposite to the leg 14.

In use, and for organizing the functional length of optical fibre cable 12 after effecting a splice in the aforementioned manner, the splice holder 38 will be introduced into the splice receptacle 50 and clamped therein. After this, the functional length of the optical fibre cable 12 is coiled. Coiling is done outside the loop supporting element 2. During coiling operation, there is no need to pay attention to the minimum bending radius of the optical fibre cable 12 for an optical loss. After coiling, the optical fibre cable 12 is introduced into U-shaped loop foot receptacle 18 and the U-shaped loop head receptacle 34. Again, the optical fibre cable 12 is held within the loop supporting element 2 by an elastic resetting force which is a reaction of bending of the optical fibre cable 12 during coiling. Due to the elastic resetting force, the coiled fibre will try to increase its bending radius. Due to the dimensions of the C-shaped loop supporting element, the resulting bending radius is less than the critical optical bending radius in a status shown in FIG. 1 or 2. This situation is such, that the looped optical fibre cable 10 can be removed from the loop supporting element 2 by lifting the bottom part thereof from the loop foot receptacle 18 and passing this foot part through the gap between the upper end of the leg 14 and the recess 49.

Figure 3:
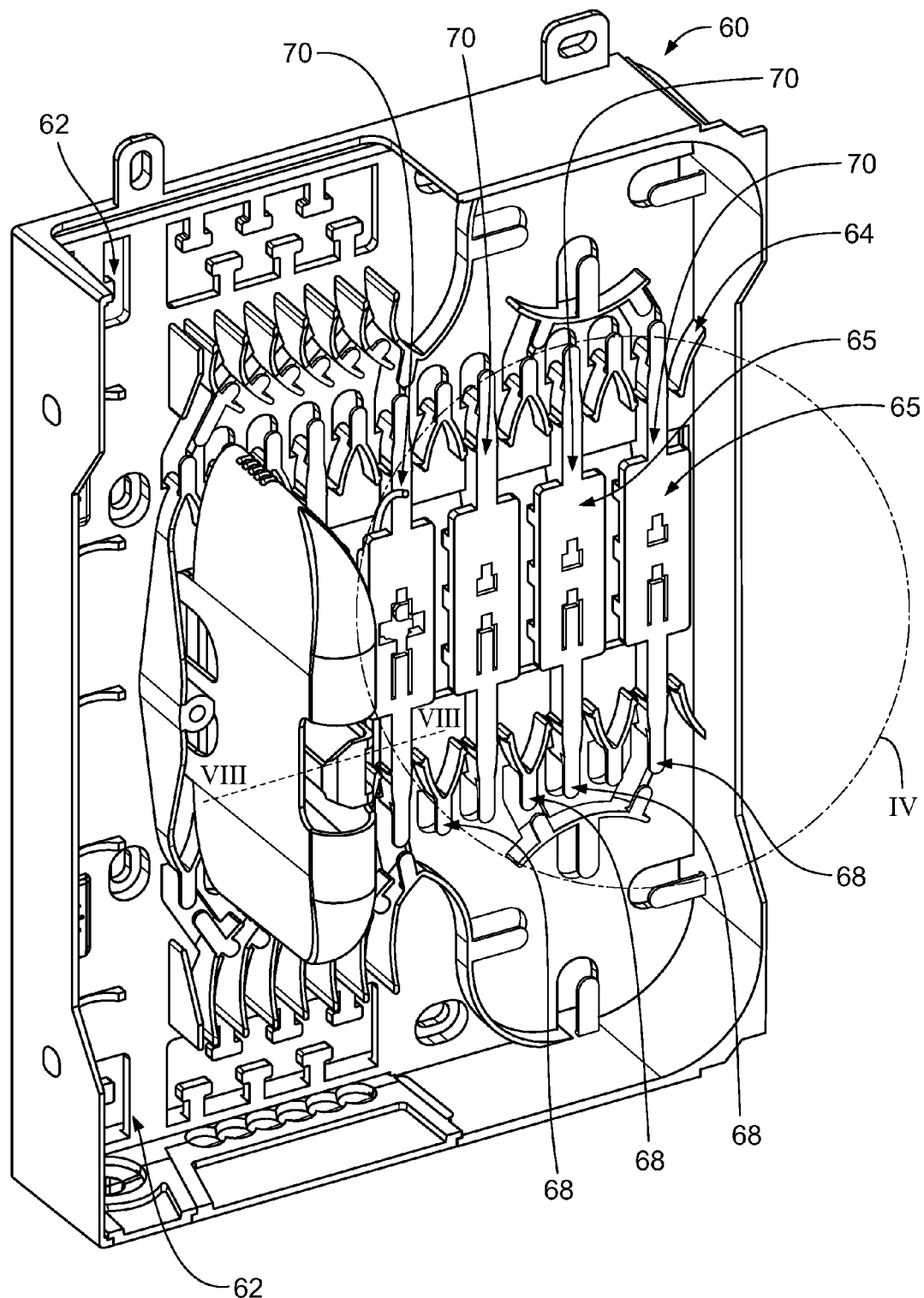
FIG. 3 is a perspective front view of a third embodiment of an organizer for an optical fibre cable.
Figure 4:
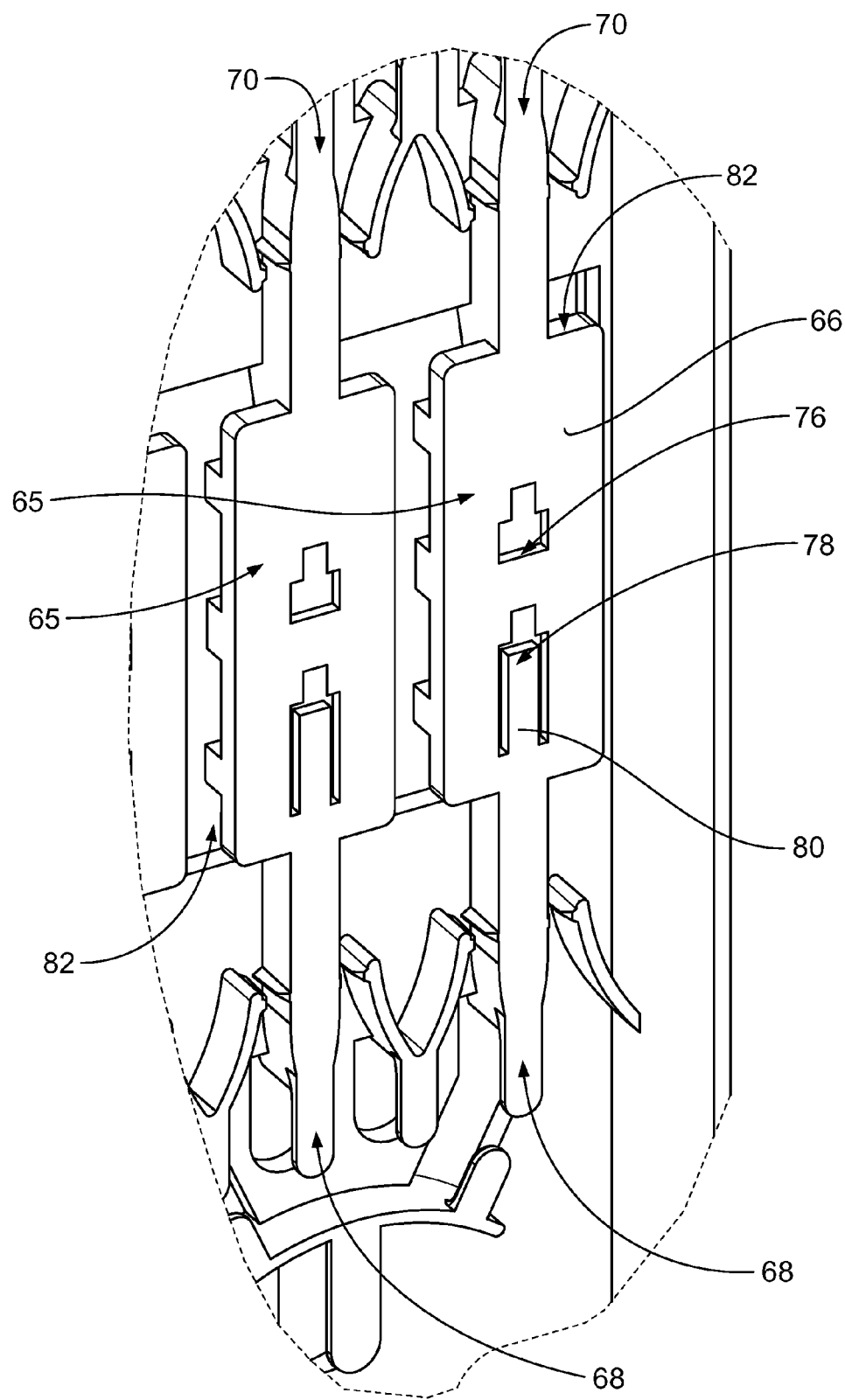
FIG. 4 is an enlarged view of detail IV in FIG. 3.

FIGS. 4 through 7 show yet another embodiment of the present invention (the reference signs of the previous embodiment are used where appropriate). This embodiment has a housing 60 being provided with a housing cover (not shown) and defining a main cable passageway 62. The housing 60 furthermore provides a base element 64 for an organizer, which base element 64 has a support section 65, which defines plural support surfaces 66, each support surface 66 being adapted to slidably guide the foot portion 4 of the loop supporting element 2 (compare FIGS. 3, 4, 7). The housing 60 furthermore defines plural cable in passages 68 and cable out passages 70, which are arranged on opposing sides to the assigned base element 64.

Figure 6:
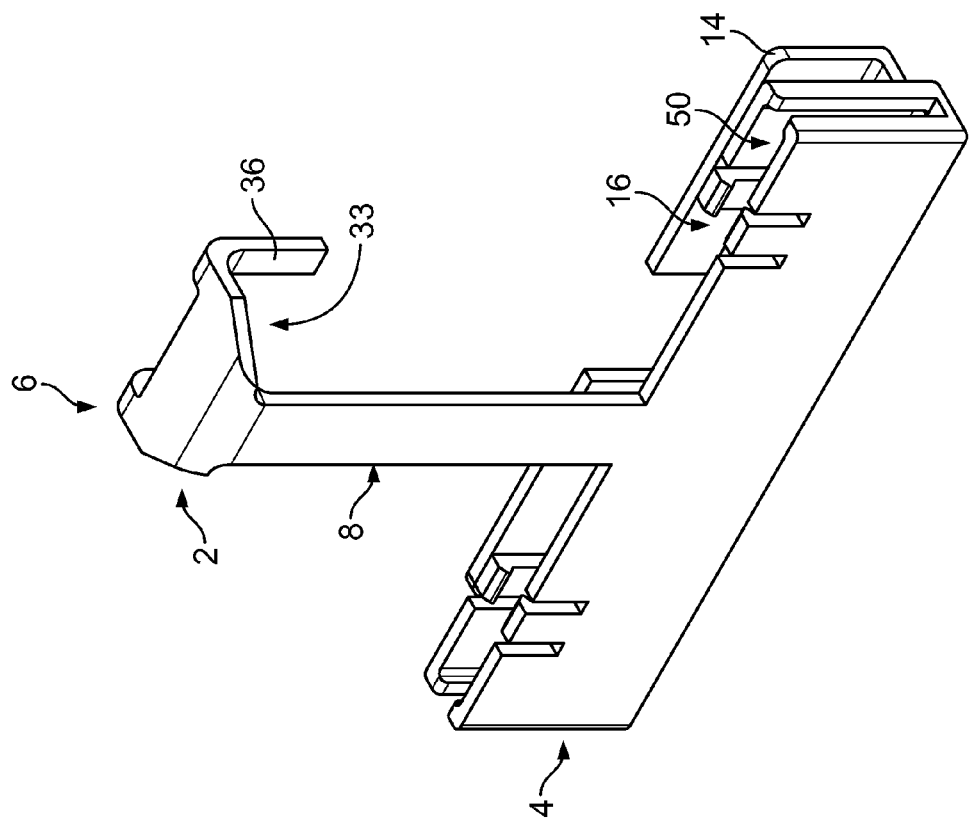
FIG. 6 is a perspective back view of a C-shaped loop supporting element of the embodiment of FIGS. 3 and 4.
Figure 5:
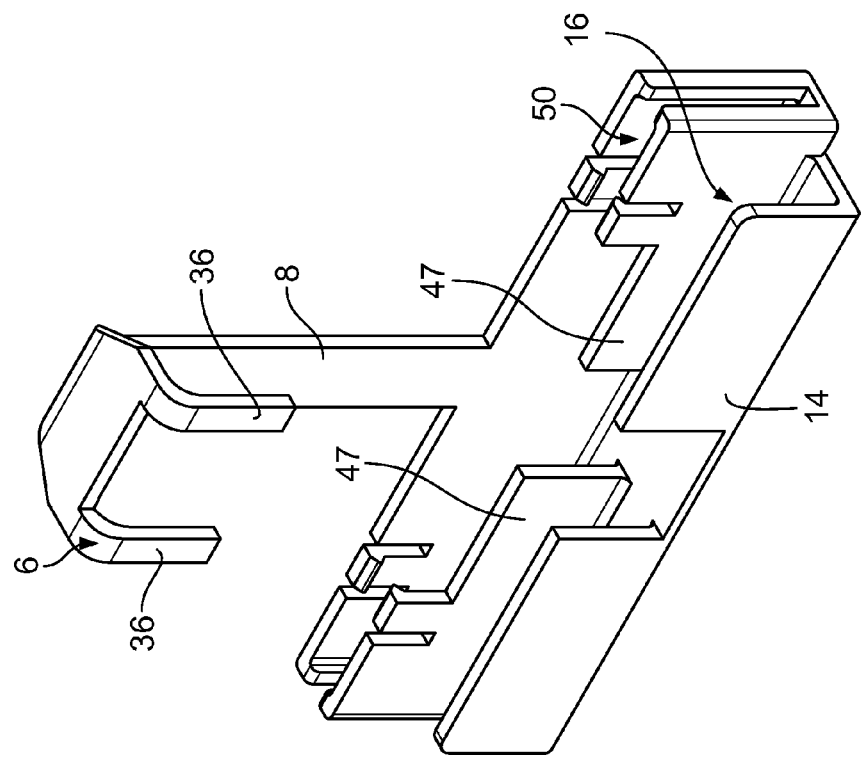
FIG. 5 is a perspective front view of a C-shaped loop supporting element of the embodiment of FIGS. 3 and 4.
Figure 7:
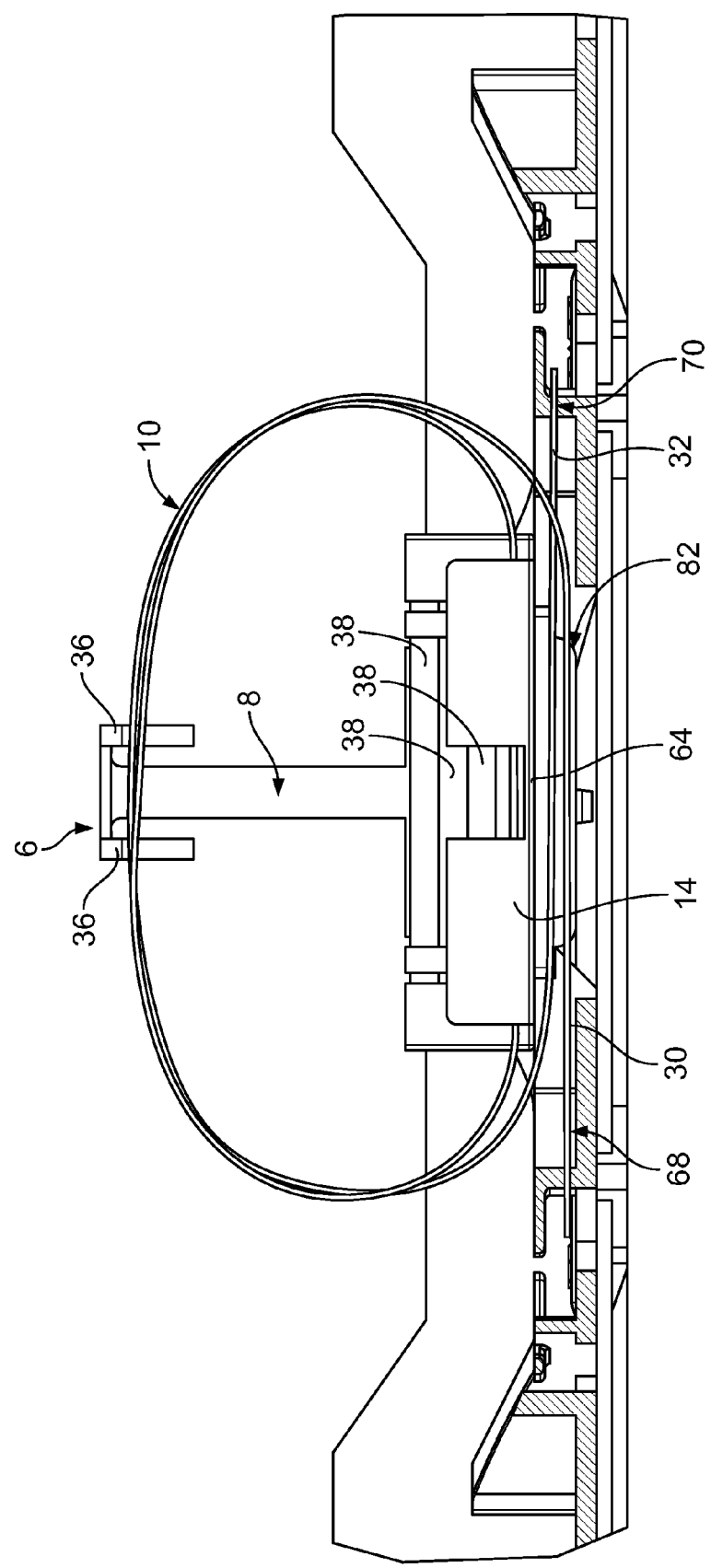
FIG. 7 is a side view of the embodiment according to FIGS. 3 to 5 (cover removed)
Figure 8:
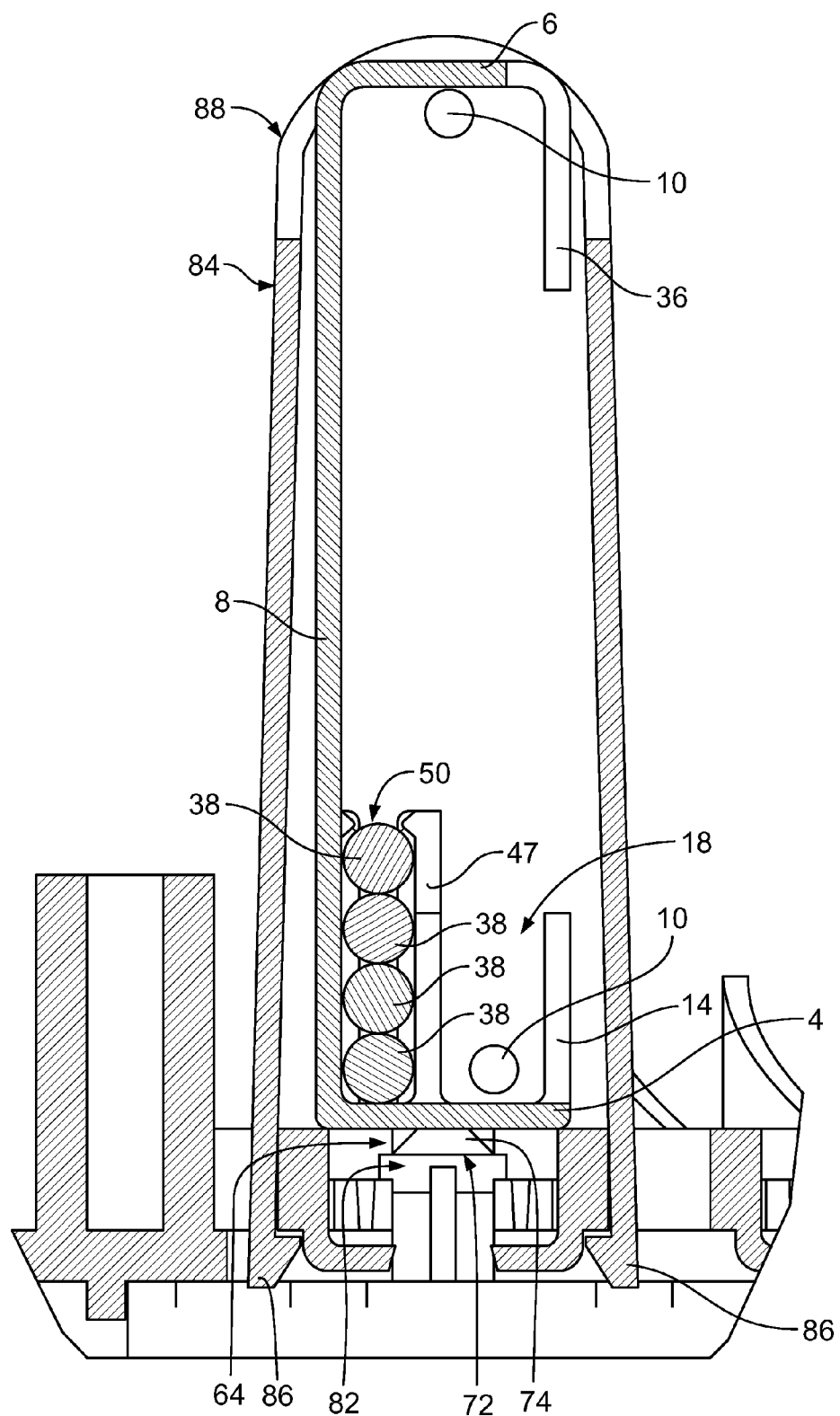
FIG. 8 is a cross-sectional view along the line of VIII-VIII of a portion of the embodiment of FIG. 3.

The C-shaped loop supporting element 2 of the third embodiment is exemplified, in particular in FIGS. 5 through 7. The embodiment has a foot portion 4 providing two U-shaped receptacles open to the head portion 6 and divided by a common wall 47. The inner U-shaped receptacle forms a splice receptacle 50 adapted to receive four splice holders 38 stacked upon each other. The other receptacle forms the U-shaped loop foot receptacle 18. The leg 14 providing a forward abutment face for the looped optical fibre cable 10 is parallel and level with two parallel legs 36 of the head portion 6. On the underside of the foot portion 4, there are provided securing means 72 comprising a boss 74. This boss 74 is adapted to be introduced into and slid relative to a groove 76 recessed in the supporting surface 66 of the base element 64 and having a hammer-head shape (compare FIG. 4). The underside of the foot portion 4 is projected by a further, not shown, boss that is adapted to be introduced into a securing groove 78 likewise shown in FIG. 4, which securing groove 78 is assigned to a spring lug 80 adapted to secure the other boss in place. Thus, when the bosses 74 are inserted into the grooves 76, 78, the C-shaped loop supporting element 2 is held on the base element 64 in a free-standing manner (compare FIG. 6).

Below the base element 64 there is provided an optical cable passageway 82, which is adapted to pass an optical fibre cable between the two guiding in and guiding out passages 68, 70, respectively.

Thus, a functional length of optical fibre cable can be provided for splicing such, that a loop 10 of said optical fibre cable 12 can be formed after splicing (compare FIG. 7). This loop is retained in the afore-described manner in the C-shaped loop supporting element 2.

The embodiment of FIGS. 3 through 7 has a separate cover identified with reference numeral 84, which cover as a generally U-shape cross-section and is circumferentially enclosed. A bottom part of said cover 84 is projected by snapping hooks 86, which are adapted to releasably secure the cover 84 against the base element 64 (compare FIG. 7). Further, the cover 84 has a central opening 66 adapted to receive the head portion 6 of the loop supporting element 2. In the mounted state, in which the cover 84 is secured to the base element 64 by the snapping hooks 86, the apex of the head portion 6 is approximately level with the apex of the cover 84. Accordingly, the thickness of the cover 84 does not contribute to the overall height of the holding means for holding the looped optical fibre cable 10. In other words, the opening 88 meets the demand of a rather complex constitution. Further, through the opening, the condition of the loop supporting element 2 is visible from outside. Thus, an operator can see, whether respective loop supporting element 2 is already used to hold a loop 10, i.e. whether a respective position contains a splice.

The invention claimed is:

1. An organizer for an optical fibre cable comprising:
a foot portion including a first leg extending upwardly to define a first loop retaining channel, the foot portion defining a foot receptacle and a splice receptacle adapted to receive a splice holder, and the foot receptacle and the splice receptacle being separated from each other by a common wall;
a head portion including a second leg extending downwardly to define a second loop retaining channel that directly faces the first loop retaining channel; and
a lug portion that extends between the foot portion and the head portion to hold the head portion at a fixed distance from the foot portion, the lug portion, the head portion, and the foot portion cooperating to define a generally C-shaped loop supporting element.

2. The organizer for an optical fibre cable according to claim 1, wherein an incoming fibre cable and an outgoing fibre cable are routed to the organizer, and wherein the loop supporting element is coupled to the splice receptacle, and wherein the splice holder holds an optical splice of the incoming and outgoing fibre cable.

3. The organizer for an optical fibre cable according to claim 2, wherein the splice receptacle is arranged next to one of the loop retaining sections.

4. The organizer for an optical fibre cable as defined in claim 1, wherein said foot portion defines a U-shaped loop foot receptacle and said head portion defines a U-shaped loop head receptacle.

5. The organizer for an optical fibre cable as defined in claim 1, wherein a cover is adapted to at least partially receive said C-shaped loop supporting element.

6. The organizer for an optical fibre cable as defined in claim 5, wherein said cover is provided with fixation members adapted to releasably fix said cover in a mounted state.

7. The organizer according to claim 6, wherein said cover has an opening exposing said head portion of said C-shaped loop supporting element in the mounted state and that in the mounted state an apex of said cover is approximately level with an apex of said head portion.

8. The organizer for an optical fibre cable as defined in claim 1, further comprising:
a base element defining a cable guiding in passage, a cable guiding out passage and a support section provided between the passages,
wherein said foot portion of said C-shaped loop supporting element is configured to mount to the base element in a free-standing manner.

9. The organizer for an optical fibre cable as defined in claim 8, wherein the foot portion of the loop supporting element is releasable from the base.

10. The organizer for an optical fibre cable as defined in claim 8, wherein said base element provides a supporting surface defining a groove, and wherein the foot portion of the loop supporting element includes a securement member keyed to slide into the groove.

11. The organizer for an optical fibre cable as defined in claim 10, wherein said groove terminates in a hammer head opening adapted to receive said securing member when being inserted through said supporting surface and that said base element provides a spring lug arranged in the vicinity of said supporting surface and adapted to cooperate with said securing member such that said C-shaped loop supporting element is secured against said base element.

12. An organizer for an optical fibre cable comprising:
a foot portion including a first leg extending upwardly to define a first loop retaining channel;
a head portion including a second leg extending downwardly to define a second loop retaining channel that directly faces the first loop retaining channel; and
a lug portion that extends between the foot portion and the head portion to hold the head portion at a fixed distance from the foot portion, the lug portion, the head portion, and the foot portion cooperating to define a generally C-shaped loop supporting element,
wherein said foot portion defines a U-shaped loop foot receptacle and said head portion defines a U-shaped loop head receptacle, and
wherein said foot portion defines a U-shaped splice receptacle adapted to receive a splice holder and that the foot receptacle and the splice receptacle are separated from each other by a common wall.

* * * * *